US006804814B1

(12) United States Patent
Ayers et al.

(10) Patent No.: US 6,804,814 B1
(45) Date of Patent: Oct. 12, 2004

(54) METHOD FOR SIMULATING BACK PROGRAM EXECUTION FROM A TRACEBACK SEQUENCE

(75) Inventors: Andrew E. Ayers, Amherst, NH (US); Richard Schooler, Cambridge, MA (US); Anant Agarwal, Weston, MA (US)

(73) Assignee: VERITAS Operating Corporation, Mountain View, CA (US)

( * ) Notice: Subject to any disclaimer, the term of this patent is extended or adjusted under 35 U.S.C. 154(b) by 0 days.

(21) Appl. No.: 09/474,680

(22) Filed: Dec. 29, 1999

(51) Int. Cl.[7] ................................................. G06F 9/44
(52) U.S. Cl. .................... 717/135; 717/128; 717/130
(58) Field of Search ................................ 717/124–135; 703/22

(56) References Cited

U.S. PATENT DOCUMENTS

| | | |
|---|---|---|
| 3,711,863 A | 1/1973 | Bloom |
| 4,667,290 A | 5/1987 | Goss et al. .................. 365/300 |
| 4,819,233 A | 4/1989 | Delucia et al. |
| 4,951,195 A | 8/1990 | Fogg, Jr. et al. ............ 364/200 |
| 5,146,586 A | 9/1992 | Nakano ...................... 395/575 |
| 5,191,646 A | 3/1993 | Naito et al. |
| 5,241,678 A | 8/1993 | Futamura et al. ........... 395/700 |
| 5,265,254 A | 11/1993 | Blasciak et al. ............ 395/700 |
| 5,321,828 A | 6/1994 | Phillips et al. .............. 395/500 |
| 5,428,786 A | 6/1995 | Sites ........................... 395/700 |
| 5,446,878 A | 8/1995 | Royal |

(List continued on next page.)

FOREIGN PATENT DOCUMENTS

| | | |
|---|---|---|
| EP | 0 286 361 A2 | 10/1988 |
| EP | 0 372 835 A2 | 12/1988 |
| EP | 0 403 415 A2 | 12/1990 |
| WO | W0 90/01738 | 2/1990 |
| WO | WO 00/11549 | 3/2000 |
| WO | WO 00/54385 | 9/2000 |

OTHER PUBLICATIONS

Both et al, "Walk Backwards to Happiness Debugging by Time Travel", CiteSeer, http://citeseer.nj.nec.com/cs/ , pp. 1–13, Apr. 1997.*

Dubey et al., "Profile–Driven Generation of Trace Smaples", IEEE, pp. 217–224, 1996.*

Robert C. Bedichek, "Some Efficient Architecture Simulation Techniques," Department of Computer Science, University of Washington, Usenix Conference, Jan., 1990.

(List continued on next page.)

*Primary Examiner*—Tuan Dam
*Assistant Examiner*—Ted T. Vo
(74) *Attorney, Agent, or Firm*—Meyertons Hood Kivlin Kowert & Goetzel, P.C.; B. Noël Kivlin

(57) ABSTRACT

A program execution data trace is created by instrumenting a program to record value sets during execution and an instruction trace. By simulating instructions either backward or forward from a first instruction associated with a recorded value set to a second instruction according to the instruction trace, a value set is determined for the second instruction. Backward and forward simulation can be combined to complement each other. For backward simulation, a table of simulation instructions is preferably maintained, which associates program instructions encountered in the instruction trace with simulation instructions which reverse the operation of the of the associated program instructions. Preferably, one or more probes is inserted into the program to save values of particular variables whose value may be difficult to determine. Preferably, the instruction trace is displayed alongside and correlated with the data trace. In one embodiment, the instruction trace is displayed and a value set is determined for an instruction upon a request by the user indicating the instruction for which the value set is desired.

91 Claims, 8 Drawing Sheets

U.S. PATENT DOCUMENTS

| | | | |
|---|---|---|---|
| 5,450,586 A | 9/1995 | Kuzara et al. | |
| 5,488,714 A | 1/1996 | Skidmore | 395/500 |
| 5,507,030 A | 4/1996 | Sites | |
| 5,546,586 A | 8/1996 | Wetmore et al. | 395/700 |
| 5,615,369 A | 3/1997 | Holler | 395/709 |
| 5,675,803 A | 10/1997 | Preisler et al. | 395/704 |
| 5,732,273 A | 3/1998 | Srivastava et al. | 395/704 |
| 5,732,275 A | 3/1998 | Kullick et al. | 395/712 |
| 5,758,061 A | 5/1998 | Plum | |
| 5,764,992 A | 6/1998 | Kullick et al. | 395/712 |
| 5,790,858 A | 8/1998 | Vogel | 395/704 |
| 5,802,373 A | 9/1998 | Yates et al. | 395/705 |
| 5,812,855 A | 9/1998 | Hiranandani et al. | 395/709 |
| 5,870,607 A | 2/1999 | Netzer | 395/704 |
| 5,966,541 A | 10/1999 | Agarwal | 395/712 |
| 5,978,588 A | 11/1999 | Wallace | 395/709 |
| 6,018,747 A | 1/2000 | Burns et al. | 707/203 |
| 6,071,316 A | 6/2000 | Goossen et al. | |
| 6,138,270 A | 10/2000 | Hsu | |
| 6,202,199 B1 | 3/2001 | Wygodny et al. | |
| 6,282,701 B1 | 8/2001 | Wygodny et al. | |

OTHER PUBLICATIONS

Robert C. Bedicheck, "Talisman: Fast and Accurate Multicomputer Simulation," 1995, Laboratory for Computer Science, Massachusetts Institute of Technology.

Colin Hunter, et al., "DOS at RISC," Byte, Nov., 1989, pp. 361–368.

Anant Agarwal, et al., "ATUM: A New technique for Capturing Address Traces Using Microcode," Proceedings of the 13th Annual Symposium on Computer Architecture, Jun. 1986.

Kazuhito, Patch System, Patent Abstract of Japan (CD–ROM), Unexamined Applications, vol. 94, No. 11 (Nov. 8, 1994).

International Business Machines Corporation, Generic Methodology for Code Patching in Binary File, 802–803 (Jun., 1998).

Ammons, G., and Larus, J., "Improving Data–Flow Analysis with Path Profiles," ACM Sigplan Notices, US, Association for Computing Machinery, 33(5) : 72–84 (1998).

Ball, T. and Larus, J.R., "Optimally Profiling and Tracing Programs," Technical Report #1031, Rev. 1, Computer Science Department, University of Wisconsin—Madison, Sep., 1991.

"Instruction Trace Apparatus. Feb. 1978." IBM Tchnical Disclosure Bulletin, 20 (9) : 1–3 (Feb. 1, 1978).

Rosen, Kenneth H., et al., Unix System V Release 4: An Introduction for New and Experienced Users, pp. 441–442, Osborne McGraw–Hill (1990).

Aho, Alfred V., et al., Compilers—Principles, Techniques and Tools, pp. 429–440 and 475–480, Addison–Wesley Publishing Company (reprinted Mar. 1998).

Ferrante, J., et al., The Program Dependence Graph and Its Use in Optimization, pp. 320–349.

Johnson, R., et al., Dependence–Based Program Analysis, pp. 78–89.

Aho, Alfred V., Compilers, Principles, Techniques, and Tools, pp. 513–580.

Feldman, S.I. and Brown, C.B. "IGOR: a system for program debugging via reversible execution," Proceedings of the ACM SIGPLAN and SIGOPS Workshop on Parallel and Distributed Degugging, pp 112–123 (1988).

Larus, J.R. "Abstract Execution: A Technique for Efficiently Tracing Programs," from Software Practice & Experience, GB (Chichester, John Wiley & Sons LTD.) PP 1241–1258 (Dec. 1, 1990).

"Productivity Tool for Online Tracing of an Assembly LISTING Using a Per Trace File," IBM Technical Disclosure Bulletin, (Nov. 1, 1987).

Lucas, C., et al., "Managing Software Evolution Through Reuse Contracts," Programming Technology Lab, Vrije Universiteit Brussel, IEEE: 165–168 (1997) . Retrieved from the IEEE database on Sep. 4, 2002.

Rothermel, G., and Harrold, M. J., "A Safe, Efficient Regression Test Selection Technique," ACM Transactions on Software Engineering and Methodology, 6(2): 173–210 (Apr. 1997,). Retrieved from the ACM database on Sep. 4, 2002.

Rothermel, G., and Harrold, M. J., "Selecting Tests and Indentifying Test Coverage Requirements for Modified Software," Department of Computer Science, Clemson University, ACM (1997) . Retrieved from the ACM database on Sep. 4, 2002.

Coppieters, K., "A Cross–Platform Binary Diff," Dr. Dobb's Journal, pp. 32, 35–36 (May 1, 1995,).

Ambras, J.P., et al., "Microscope: An Integrated Program Analysis Toolset," Hewlett–Packard Journal, 4:71–82 (Aug. 1, 1988,).

* cited by examiner

| INSTRUCTION TRACE 30 | | DATA TRACE 32 | | | | | |
|---|---|---|---|---|---|---|---|
| | | r1= | r2= | r3= | r4= | r5= | |
| ///// | 58A | | | | | | 58B |
| sub r1,r2,7 | 56A | | | | | | 56B |
| add r5,r1,r4 | 54A | | | | | | 54B |
| ld r4,mem1 | 52A | | | | | | 52B |
| ⋮ | | | | ⋮ | | | |
| Instruction X | 50A | | | | | | 50B |
| add r1,r2,r3 | 48A | 12 | 9 | ??? | 100 | 12 | 48B |
| inc r1 | 46A | 13 | 9 | ??? | 100 | 12 | 46B |
| inc r1 | 44A | 14 | 9 | ??? | 100 | 12 | 44B |
| inc r1 | 42A | 15 | 9 | ??? | 100 | 12 | 42B |
| mv r3,0 | 40A | 15 | 9 | 0 | 100 | 12 | 40B |

FIG. 2C

| INSTRUCTION TRACE 30 | | DATA TRACE 32 | | | | | |
|---|---|---|---|---|---|---|---|
| | | r1= | r2= | r3= | r4= | r5= | |
| ///// | 58A | | | | | | 58B |
| sub r1,r2,7 | 56A | | | | | | 56B |
| add r5,r1,r4 | 54A | | | | | | 54B |
| ld r4,mem1 | 52A | | | | | | 52B |
| ⋮ | | | | ⋮ | | | |
| Instruction X | 50A | ??? | 9 | 3 | 100 | 12 | 50B |
| add r1,r2,r3 | 48A | 12 | 9 | ??? | 100 | 12 | 48B |
| inc r1 | 46A | 13 | 9 | ??? | 100 | 12 | 46B |
| inc r1 | 44A | 14 | 9 | ??? | 100 | 12 | 44B |
| inc r1 | 42A | 15 | 9 | ??? | 100 | 12 | 42B |
| mv r3,0 | 40A | 15 | 9 | 0 | 100 | 12 | 40B |

| INSTRUCTION TRACE 30 | | DATA TRACE 32 | | | | | |
|---|---|---|---|---|---|---|---|
| | | r1= | r2= | r3= | r4= | r5= | |
| XXXXXXXX | 58A | | | | | | 58B |
| sub r1,r2,7 | 56A | | | | | | 56B |
| add r5,r1,r4 | 54A | ??? | 9 | 3 | ??? | 12 | 54B |
| ld r4,mem1 | 52A | ??? | 9 | 3 | 100 | 12 | 52B |
| ⋮ | | | | ⋮ | | | |
| Instruction X | 50A | ??? | 9 | 3 | 100 | 12 | 50B |
| add r1,r2,r3 | 48A | 12 | 9 | 3 | 100 | 12 | 48B |
| inc r1 | 46A | 13 | 9 | 3 | 100 | 12 | 46B |
| inc r1 | 44A | 14 | 9 | 3 | 100 | 12 | 44B |
| inc r1 | 42A | 15 | 9 | 3 | 100 | 12 | 42B |
| mv r3,0 | 40A | 15 | 9 | 0 | 100 | 12 | 40B |

FIG. 2H

| INSTRUCTION TRACE 30 | | DATA TRACE 32 | | | | | |
|---|---|---|---|---|---|---|---|
| | | r1= | r2= | r3= | r4= | r5= | |
| XXXXXXXX | 58A | ??? | 9 | 3 | ??? | ??? | 58B |
| sub r1,r2,7 | 56B | ??? | 9 | 3 | ??? | ??? | 56B |
| add r5,r1,r4 | 54A | ??? | 9 | 3 | ??? | 12 | 54B |
| ld r4,mem1 | 52A | ??? | 9 | 3 | 100 | 12 | 52B |
| ⋮ | | | | ⋮ | | | |
| Instruction X | 50A | ??? | 9 | 3 | 100 | 12 | 50B |
| add r1,r2,r3 | 48A | 12 | 9 | 3 | 100 | 12 | 48B |
| inc r1 | 46A | 13 | 9 | 3 | 100 | 12 | 46B |
| inc r1 | 44A | 14 | 9 | 3 | 100 | 12 | 44B |
| inc r1 | 42A | 15 | 9 | 3 | 100 | 12 | 42B |
| mv r3,0 | 40A | 15 | 9 | 0 | 100 | 12 | 40B |

| INSTRUCTION TRACE 30 | | DATA TRACE 32 | | | | | |
|---|---|---|---|---|---|---|---|
| | | r1= | r2= | r3= | r4= | r5= | |
| XXXX | 58A | ??? | ⑨ | 3 | ??? | ??? | 58B |
| sub r1,r2,⑦ | 56A | 2 | 9 | 3 | ??? | ??? | 56B |
| add r5,r1,r4 | 54A | ??? | 9 | 3 | ??? | 12 | 54B |
| ld r4,mem1 | 52A | ??? | 9 | 3 | 100 | 12 | 52B |
| | | | | | | | |
| Instruction X | 50A | ??? | 9 | 3 | 100 | 12 | 50B |
| add r1,r2,r3 | 48A | 12 | 9 | 3 | 100 | 12 | 48B |
| inc r1 | 46A | 13 | 9 | 3 | 100 | 12 | 46B |
| inc r1 | 44A | 14 | 9 | 3 | 100 | 12 | 44B |
| inc r1 | 42A | 15 | 9 | 3 | 100 | 12 | 42B |
| mv r3,0 | 40A | 15 | 9 | 0 | 100 | 12 | 40B |

FIG. 2I

| INSTRUCTION TRACE 30 | | DATA TRACE 32 | | | | | |
|---|---|---|---|---|---|---|---|
| | | r1= | r2= | r3= | r4= | r5= | |
| XXXX | 58A | ??? | 9 | 3 | 10 | ??? | 58B |
| sub r1,r2,7 | 56A | ② | 9 | 3 | 10 | ??? | 56B |
| add r5,r1,r4 | 54A | 2 | 9 | 3 | 10 | ⑫ | 54B |
| ld r4,mem1 | 52A | 2 | 9 | 3 | 100 | 12 | 52B |
| | | | | | | | |
| Instruction X | 50A | 2 | 9 | 3 | 100 | 12 | 50B |
| add r1,r2,r3 | 48A | 12 | 9 | 3 | 100 | 12 | 48B |
| inc r1 | 46A | 13 | 9 | 3 | 100 | 12 | 46B |
| inc r1 | 44A | 14 | 9 | 3 | 100 | 12 | 44B |
| inc r1 | 42A | 15 | 9 | 3 | 100 | 12 | 42B |
| mv r3,0 | 40A | 15 | 9 | 0 | 100 | 12 | 40B |

FIG. 2J

METHOD FOR SIMULATING BACK PROGRAM EXECUTION FROM A TRACEBACK SEQUENCE

BACKGROUND OF THE INVENTION

With the proliferation of the internet and electronic commerce ("eCommerce"), businesses have begun to rely on the continuous operation of their computer systems. Even small disruptions of computer systems can have disastrous financial consequences as customers opt to go to other web sites or take their business elsewhere.

One reason that computer systems become unavailable is failure in the application or operating system code that runs on them. Failures in programs can occur for many reasons, including but not limited to, illegal operations such as dividing by zero, accessing invalid memory locations, going into an infinite loop, running out of memory, writing into memory that belongs to another user, accessing an invalid device, and so on. These problems are often due to program bugs.

Ayers, Agarwal and Schooler (hereafter "Ayers"), "A Method for Back Tracking Program Execution," U.S. application Ser. No. 09/246,619, filed on Feb. 8, 1999, now U.S. Pat. No. 6,353,924, and incorporated by reference herein in its entirety, focuses on aiding rapid recovery in the face of a computer crash. When a computer runs an important aspect of a business, it is critical that the system be able to recover from the crash as quickly as possible, and that the cause of the crash be identified and fixed to prevent further crash occurrences, and even more important, to prevent the problem that caused the crash from causing other damage such as data corruption. Ayers discloses a method for recording a sequence of instructions executed during a production run of the program and outputting this sequence upon a crash.

Traceback technology is also important for purposes other then crash recovery, such as performance tuning and debugging, in which case some system event or program event or termination condition can trigger the writing out of an instruction trace.

The preferred method for traceback disclosed by Ayers is binary instrumentation in which code instrumentation is introduced in an executable. The instrumentation code writes out the trace.

SUMMARY OF THE INVENTION

In an improvement to the traceback technology of Ayer, an embodiment of the present invention records data values loaded or stored by the program as well as the instructions in one or more circular buffers. These buffers are dumped upon a crash, providing a user with a data and instruction trace. The data values are often very useful in reconstructing the cause of the crash.

Recording the data values often can significantly slow a program down. The present invention mitigates this problem by using a traceback instruction sequence to guide a backward simulation of the execution, recording in a file the sequence of all computable data values starting with the final values contained in a final value set. Of course, after some point, it is possible that data values cannot be computed. Thus, this technique is approximate, and the previous data history it yields is limited.

As an example, assume a procedure receives an argument value A, which is incremented by 1 three times in the procedure. Given a value of A from a recorded value set, previous values of A can be reconstructed by subtracting 1 from the current value of A whenever an instruction incrementing the value of A is encountered. These intermediate values are recorded in a data trace. Thus, the initial value of the argument A upon entering the procedure is obtained.

In an alternate embodiment, forward simulation, using the trace and an intermediate value set, is used In addition, the same set of values is recorded at intermittent intervals of time. These are intermediate-value-sets.

The final values of all the registers, the stack, and memory are recorded. This is called the final-value-set.

Upon a crash, system level parameters and values are stored. These include the names and identifiers of other processes running on the same machine at the point of the crash, the names and identifiers of other processes running on other machines in a distributed networked environment at the point of the crash, the set of files in use by the failed process, and system level parameters at the point of the crash such as CPU utilization, active pages, size of swapped data, etc.

Therefore, in accordance with an embodiment of the present invention, a method for creating a program execution data trace, comprises recording a first value set associated with the execution of a first instruction referenced in an instruction trace. For a second instruction referenced in the instruction trace, and responsive to the first value set, a second value set is determined by simulating instructions from the first instruction to the second instruction according to the instruction trace.

Preferably, the program is instrumented to record the value sets. Either the program source or the program binary can be instrumented. The instrumentor itself can be part of a compiler.

The instrumented instruction and the second instruction are different execution instances but can be the same statement or different statements within the program.

In a further embodiment, determining the second value set is responsive to a control flow graph or representation of the program.

In one embodiment, the second instruction executes before the first instruction, possibly immediately prior to the first instruction, such that instructions are simulated backward from the first instruction to the second instruction.

In one embodiment, a table is maintained which associates program instructions encountered in the instruction trace with simulation instructions which reverse the operation of the of the associated program instructions. Thus the associated instruction is "back-simulated."

The instruction trace can be examined for a previous computation of an unknown value. For example, the previous computation can be an immediate previous dominator of the "current" instruction found by searching backwards through the instruction trace. Alternatively, the previous computation can be determined by using a static analysis of the program to find the immediate dominator of an instruction, where there are no intervening instructions impacting the value of the variable.

The first value set can be a final value set, which can be recorded responsive to a program crash. A final value set can comprise system level parameters and values, such as but not limited to the names and identifiers of other processes running on the same machine at the time of recording, the names and identifiers of other processes running on other machines in a distributed networked environment at the time of recording, the set of files in use by the program at the time of recording, CPU utilization information at the time of recording, active pages at the time of recording and/or a size of swapped data at the time of recording.

The first value set can also be an intermediate value set, such as is recorded by instrumented code at regular or other intervals, upon a predetermined or user-specified event. An event can be, for example, the loading or storing of a value.

In an alternate embodiment, the second instruction executes after the first instruction, for example, immediately after the first instruction, such that instructions are simulated forward from the first instruction to the second instruction. The first value set can be an intermediate value set as with backward simulation, or an initial value set, recorded, for example, upon entering a routine.

In a further embodiment, a probe is inserted into the program to save a value of a particular variable at a particular instruction in the program. Examples of values a probe might record include, but are not limited to, values returned from calls such as system calls, values returned from I/O calls, for example, those from a user input to a web form and values obtained from database records.

Probes are used to determine values where the value is not determinable by the usual backward or forward simulation. In one embodiment, simulating a simulate-backward or -forward process is itself simulated, for example, in the instrumentor or compiler, to determine the variable instance. Alternatively, a difficult to evaluate variable can be determined by performing a dry run of a simulation on at least one sample trace sequence.

Placement of a probe instruction and selection of the particular variable can also be determined based on an analysis of the program, such as a control flow and/or data flow analysis.

In one embodiment, the quantity of data to be recorded is adjusted with a control such as a virtual dial shown on a display. The control can allow a user to, for example, set the time interval after which data is recorded, or alternatively, to set the frequency at which to record data, or alternatively to set the frequency of a predetermined event at which to record data, or alternatively to set the type of data to be recorded, or to set address ranges within which to record data.

In a further embodiment, a symbol table or an extended range table is accessed to retrieve a variable's name. The variable's name is then displayed next to the variable's value. Similarly, the source line table is accessed to retrieve a source line number corresponding to an instruction in the trace.

Furthermore, means are provided in an embodiment of the present invention to focus on variables of a particular interest. Such variables can include, but are not limited to, program variables named in source code, registers, variables at specified memory locations, and variables within a specified memory range. Temporary variables created by a compiler can be excluded.

The data trace can be presented to a user, including a human user or another software application. For example, the data trace can be displayed on a display device for a human user, or can be saved to a file or printed on a printer. The instruction trace is preferably displayed alongside and correlated with the data trace.

In one embodiment, determining a second value set is performed only upon a request indicating for which instruction the second value set is desired.

The instrumented code can be such that answers produced by instructions are recorded. For example, an add instruction can be instrumented such that the sum is recorded.

In at least one embodiment, an input device permits a user to request a value of a data variable corresponding to a particular instruction in the instruction trace. The simulator then performs the step of determining the second value set by simulating instructions to the particular instruction and displays the second value set on the display.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A–2J are schematic diagrams illustrating the reconstruction of a data trace by an embodiment of the present invention.

DETAILED DESCRIPTION

Figure 1:
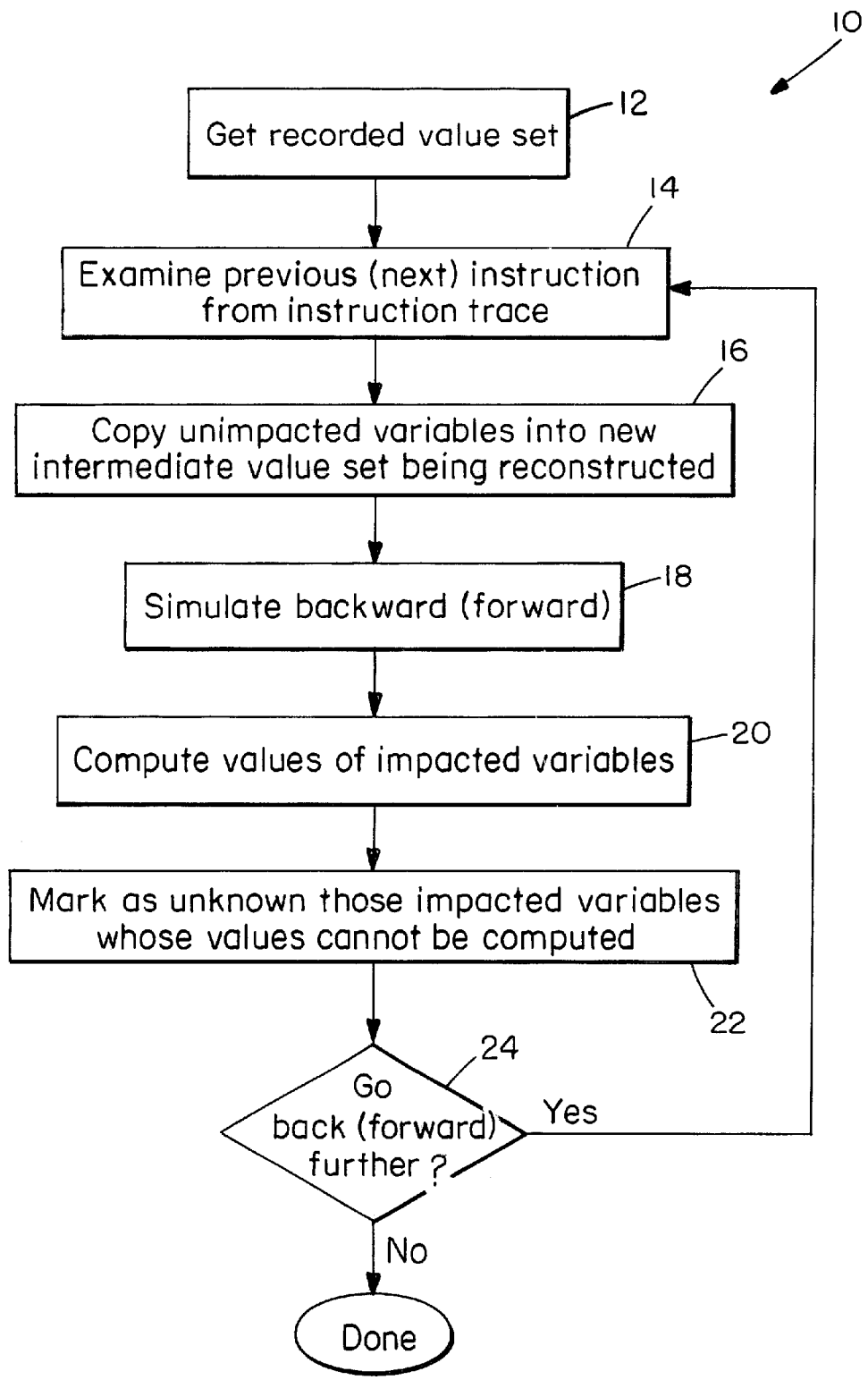
FIG. 1 is a flowchart of an embodiment of the present invention, illustrating the reconstruction of a data trace from an instruction trace and a recorded value set, using backward simulation.

U.S. application Ser. No. 09/246,619, filed by Applicants on Feb. 8, 1999, now U.S. Pat. No. 6,353,924 describes a method for storing a traceback sequence of instructions. It would also be useful to know the values of variables just before and just after execution of each instruction. Such information can aid in debugging, for example, upon a system error, or upon inappropriate operation by a program. Ideally, values could be recorded for every instruction executed. However, this would lead to an inordinate amount of overhead, significantly slowing down the program, and its feasibility is therefore questionable.

Preferred embodiments of the present invention intermittently, or upon specific events such as a program crash, record a value set. A value set is a collection of values of registers, a processor stack and memory at the time of the recording. A source or binary program can be instrumented to add code to perform the recording. Such instrumentation is described in U.S. Pat. No. 5,966,541, "Test Protection, and Repair Through Binary-Code Augmentation," incorporated by reference herein. Instrumentation occurs in an instrumentor, which can be part of a compiler or can be a separate process.

A preferred embodiment of the present invention propagates values backwards from a recorded value set in a trace as follows.

The execution or instruction trace describes successive instructions executed by the program, while a value set represents variable values after a particular instruction. To propagate values backwards one instruction, an embodiment of the present invention analyzes the instruction in the trace immediately preceding the point at which the value set was obtained, calculates the set of impacted variables, for example, registers or memory locations, and goes through a calculation process to obtain the values of impacted variables before the instruction was executed. An impacted variable is one whose value is changed by the instruction.

wards simulation instruction. The instructions in the table below are shown as examples. Others can be derived straightforwardly.

| Trace Instr. | Known | Back Instr. | Obtained |
|---|---|---|---|
| INC VAR1 | VAR1_after | SUB VAR1_before VAR1_after 1 | VAR1_before |
| DEC VAR1 | VAR1_after | ADD VAR1_before VAR1_after 1 | VAR1_before |
| ADD VAR1 VAR2 | VAR2_before, VAR1_after | SUB VAR1_before VAR1_after VAR2_before | VAR1_before |
| SUB VAR1 VAR2 | VAR2_before, VAR1_after | ADD VAR1_before VAR1_after VAR2_before | VAR1_before |
| ADD VAR1 VAR2 | VAR1_before, VAR1_after | SUB VAR2_before VAR1_after VAR1_before | VAR2_before |
| SUB VAR1 VAR2 | VAR1_before, VAR1_after | ADD VAR2_before VAR1_before VAR1_after | VAR2_before |
| MV VAR1 VAR2 | VAR1_after | MV VAR2_before VAR1_after | VAR2_before |
| ADD VAR1 VAR2 VAR3 | VAR1_after, VAR2_before | SUB VAR3_before VAR1_after VAR2_before | VAR3_before |
| ADD VAR1 VAR2 VAR3 | VAR1_after, VAR3_before | SUB VAR2_before VAR1_after VAR3_before | VAR2_before |
| LD VAR1 VAR2 | VAR1_after | ST VAR2_before VAR1_after | VAR2_before |
| ST VAR1 VAR2 | VAR1_after | LD VAR2_before VAR1_after | VAR2_before |

In other situations, if the value of the impacted variable either before or after instruction execution is known, then in many cases, the value in one of the non-impacted variables whose value was unknown can be calculated.

In the ensuing discussion, single operand instructions are denoted as "OP VAR," where OP represents the instruction's operation code, and VAR represents the impacted variable. Its value after instruction execution depends on the operation and the value of VAR before instruction execution.

Double operand instructions are denoted as "OP VAR1 VAR2," where VAR1 is the impacted variable. Its value after instruction execution is a function of the values in VAR1 and VAR2 before instruction execution. VAR2 is not impacted.

A third type of instruction is denoted as "OP VAR1 VAR2 VAR3." In such instructions, VAR1 is the impacted variable. Its value after instruction execution is a function of the values in VAR2 and VAR3 before instruction execution. VAR2 and VAR3 are not impacted.

In some simple situations, the calculation process of backwards simulation involves a single operation. Call this the backwards simulation instruction. The backwards simulation does not use as its backwards simulation instruction the same instruction as was executed (and present in the trace immediately preceding the point at which the value set was obtained). Rather, it uses a backwards instruction that is related to the executed instruction. The backwards simulator can maintain a table of backwards simulation instructions to execute given many of the types of instructions that are encountered, such as partially shown in the table below.

In the table, variables denoted as VAR include registers, memory locations, or constants. The notation VAR_before refers to a variable's value before the trace instruction execution. Similarly, the notation VAR_after refers to a variable's value after the instruction is executed.

The instruction on the left hand side of the table represents an instruction from an instruction trace. The second column contains the list of variables used by the instruction whose values are known either before or after instruction execution. The third column denotes the corresponding backwards simulation instruction, and the right hand column contains the resulting variable value that is obtained from the back- For example, the LD instruction loads a value from VAR2, which is typically but not necessarily a memory location, into VAR1, which is typically a register. Similarly, the ST instruction stores a value from VAR2 into VAR1.

Where an increment instruction (INC), which adds 1 to its argument, is encountered in the trace, a decrement (subtraction by 1) instruction is simulated to determine the value of the argument before the INC instruction executed, and vice versa. To simulate backwards an arithmetic operation such as add (ADD) or subtract (SUB) requires knowledge of the values of the result, e.g., the respective sum or remainder, and one of the arguments, e.g., the addend, minuend or subtrahend, immediately after execution of the instruction.

Alternatively, both arguments can be found by further analysis as described below.

FIG. 1 is a flowchart 10 of an embodiment of the present invention, illustrating the reconstruction of a data trace from an instruction trace and a recorded value set, using backward simulation. While the text below describes backward simulation, forward simulation is similar, and forward simulation steps are referred to parenthetically in FIG. 1.

First, at Step 12, the recorded value set is retrieved from which backward or forward simulation will be generated. This might be a final value set recorded upon a program crash, or at the exit of a routine, or it could be an initial value set recorded upon entering a routine, or some intermediate recorded value set.

In Step 14, the last instruction executed previous to the recording of the value set is retrieved from the instruction trace and examined. In Step 16, the values of any variables which are not impacted by the instruction are copied into a new value set corresponding to the previous instruction.

In Step 18, a backward simulation occurs of the previous instruction, and if possible, values of impacted variables are computed at Step 20, for example using a table as discussed previously, or by analysis. Any impacted variables whose values cannot be computed are marked as unknown (Step 22).

This process (Steps 14–22) is repeated for each previous instruction while simulating backward, each time at Step 14, retrieving the sequentially previously executed instruction from the instruction trace, until no further data trace is required, as determined at Step 24. In this manner, a value set can be reconstructed, from the instruction trace and the recorded value set, for each instruction in the instruction trace. Later we describe how both the register and the assembly-lined instructions can be related to source-code level statements and variables.

Figure 2A:

FIGS. 2A–2J illustrate various aspects of an embodiment of the present invention. Suppose, as shown in FIG. 2A, that an instruction trace 30 is obtained from an execution of the program, and that a value set 40B has been recorded after the execution of instruction 40A, as indicated by the double border. Suppose further that a data trace 32 corresponding to the instruction trace is desired. The present invention can derive a data trace from the instruction trace 30 and the recorded value set 40B by simulating backwards through the instruction trace. Both the registers and the assembly-level instructions can be related to source-code level statements and variables, as discussed below.

Figure 2B:

In FIG. 2B, the value set 42B corresponding to the point just prior to execution of instruction 40A is at least partially reconstructed by first copying the values of all unimpacted variables, for example r1, r2, r4 and r5 from the recorded value set 40B. This corresponds to Step 16 in FIG. 1.

Appropriate values for impacted variables are either computed by simulating backwards or forward (Steps 18 and 20 of FIG. 1) and representing those values in the new intermediate value set 42B, or in certain cases where it is not possible to compute such values, by indicating in the new value set 42B that those variables' values are no longer known (Step 22 of FIG. 1).

For example, instruction 40A copies the value "0" into register r3, and thus impacts register r3. The value in r3 before execution of instruction 40A cannot immediately be known. Therefore, in reconstructed value set 42B, r3 is marked as unknown. Although question marks are used to graphically indicate this unknown state, one skilled in the art would recognize that there are other ways to mark a value as unknown which may be more suitable to a computer.

As FIG. 2C shows, to calculate the value of register r1 before the execution of instruction 42A, the operation of instruction 42A must be reversed. Since instruction 42A incremented the value in register r1 by one, that value must now be decremented by one to obtain the value of r1 before the execution of instruction 42A. By using a table such as that described above, the backward simulator discovers that for an INC instruction, it needs to simulate a DEC instruction. Decrementing the value recorded in value set 42B yields 15−1=14. This calculated value (14) is then included in the value set 44B.

This backward propagation of unimpacted known and unknown values and calculation of impacted values continues through the instruction trace, reconstructing new value sets 46B and 48B.

As FIG. 2D demonstrates, in reconstructing value set 50B, two items are noteworthy. First, instruction 48A adds the values in registers r2 and r3 and places the sum in register r1. Since register r1 is impacted, its previous value is unknown, and it is therefore marked as unknown in value set 50B.

Second, the value of r3 can now be calculated by simulating backward the add instruction 48A by using the above table, that is, by subtracting r2 from r1. Since the values of r1 immediately after execution of instruction 48A, and of r2 just prior to execution of instruction 48A are known, the value of r3 prior to instruction 48A's execution can be derived. That is, r3=r1−r2=12−9=3. Therefore the value "3" is stored for register r3 in the value set 50B. Calculation of r3 can of course be avoided if there is no desire to know its value.

Figure 2E:

As FIG. 2E shows, in at least one embodiment of the present invention, this calculated value of "3" can now be propagated forward as far as value set 42B. Now, assume for FIGS. 2F–2J that it is desirable to determine the value of register r1 immediately prior to instruction 48A, that is, immediately after the execution of Instruction X 50A. As noted above, instruction 48A adds the contents of registers r2 and r3 and puts the sum into register r1. If register r1 corresponds to some variable VAR1 prior to Instruction X, then register r1 and corresponding variable VAR1 are "impacted" by instruction 48A.

Figure 2F:

As illustrated in FIG. 2F, this process of backward simulation repeats through the instruction trace 30. Finally, instruction 52A is reached. Assuming that registers r1–r5 have not been impacted, their values propagate upward into each value set in the trace, up to and including the value set 52B corresponding to values immediately following the execution of instruction 52A.

As shown in FIG. 2G, since instruction 52A is a load instruction, loading the contents of memory from some address mem1 into register r4, the content of register r4 before instruction 52A, i.e., immediately after instruction 54A, cannot immediately be known. Therefore, while values of registers r2, r3 and r5 propagate up to value set 54B, register r4, like r1, is now marked as unknown.

Because the value in r4 was known to be 100 after the load instruction, the value in mem1 is now known to be 100 both before and after the load instruction.

In FIG. 2H, unimpacted data values are finally propagated to the beginning of the instruction sequence 30, at the point 58A just before execution of the first instruction 56A in the sequence.

Instruction 56A subtracts "7" from the value contained in register r2 prior to execution, and stores the remainder in register r1.

In FIG. 2I, since register r2 is known to contain the value "9" before the execution of instruction 56A, by virtue of the data trace reconstructed thus far, the value of register r1 for value set 56B corresponding to the time immediately following execution of instruction 56A, can now be determined, that is, r1=r2−7=9−7=2.

As FIG. 2J shows, this computed value of register r1, that is, the value "2", can now be propagated forward through the partially reconstructed value sets 54B, 52B and 50B, answering the question as to what value r1 holds just before execution of instruction 48A.

Note also that, in FIG. 2I, because instruction 54A impacts register r5, r5's value is not known before instruction 54A, and therefore, in value set 56B, r5 is marked as unknown. However, because the value of r5 was known to be "12" immediately after instruction 54A, as determined in value set 54B, and because register r1's value has been determined at the point before instruction 54A, the value contained in register r4 before execution of instruction 54A must be: r5−r1, or 12−2=10. Therefore the value 10 is can be entered into value set 56B, and propagate upward to value set 58B and downward to value set 54B.

It may be desirable to obtain values for only selected points in the execution trace. For example, in at least one embodiment of the present invention, a user is presented with the instruction or execution trace, and can indicate an instruction for which he desires to see the corresponding value set, or alternatively, for example, a subset of those values involved in the instruction.

For example, alternative methods can calculate the unknown value of impacted registers such as r1 before instruction 48A is executed, without tracing backwards through every step.

At least one embodiment of the present invention can look back through the instruction trace 30 for a previous computation of the value in r1. For example, the instruction sequence of FIGS. 2A–2J begins with a write into register r1, i.e., the add instruction 48A over which the present invention attempts to "simulate backwards." The sub instruction 56A, which subtracts 7 from r2 and leaves the remainder in r1, is a previous computation of r1. If there are no intervening instructions in the instruction sequence 30 which update r1, then the value determined by the sub instruction 56A, if calculable, can be brought forward. Instruction 56A is called the "immediate previous dominator" of instruction 48A.

Some assistance can be obtained from a static analysis of the program. Such analysis can be, for example, a control flow analysis, or a data flow analysis, or both. This assistance can eliminate the need to look backwards in the trace. Suppose a static analysis of the program reveals that the "add r1, r2, r3" instruction 48A is immediately dominated by the "sub r1, r2, 7" instruction 56A, i.e., that instruction 56A always precedes the add instruction 48A regardless of the path taken. If the analysis assures that there was no intervening write of r1 between the executions of the instructions 56A, 48A, then, again, the value in r1 previous to the execution of instruction 48A can be computed.

Similar techniques can be employed to propagate variable values forward from an initial value set or an intermediate value set to produce a new value set that represents the values after the execution of the subsequent instruction in the trace.

Returning to the instruction "add r1, r2, r3", the value in the impacted register r1 can be computed following the execution of this instruction by adding the contents of r2 and r3 if they are known. If the values in r2 and r3 are unknown, then register r1 is also marked as unknown for the rest of the analysis.

If forward simulation is started from an instruction which executes just after the recording of an initial- or intermediate-value-set, then unlike the backwards simulation process, the value of an impacted variable can always be computed, if at all, without needing to search backwards in the trace.

Backwards simulation and forward simulation can also be used together, as was illustrated with respect to FIGS. 2A–2J. For example, at times, a value might be available later in the trace that can help deduce a value earlier in the trace.

In some cases these simple techniques can still result in many of the variables' values being marked unknown. To improve the accuracy of this technique, special instrumentation probes can be used to specifically monitor the changes to such variable values that result from particular complex instructions or from invocations of code sequences that do not contain instrumentation that will reveal the exact sequence of statement executions. The above techniques can be straightforwardly extended to take advantage of such information when it is available.

For example, suppose the value in a register r1 just after execution of some instruction "sub r1, r2, r3" instruction, is needed and r1 cannot be calculated by backward simulation. If the values in r2 and r3 are unknown at the start of this instruction, then code instrumentation can be inserted after this instruction to write out the value in register r1 into a log file or into memory. Then, when the backwards simulation process discovers that it cannot compute the value in r1 after the instruction, the value is simply obtained from the log.

Which variable value should be monitored can be determined by, for example, simulating and analyzing trial simulate-back processes in the instrumentation phase, i.e., within the instrumentor, with the aid of a control flow representation, to decide which variable value instances will be hard to determine. Alternatively, one or more dry runs of backwards simulation can produce sample trace sequences which can show where the values of particular variables can be difficult to obtain.

Figure 3:
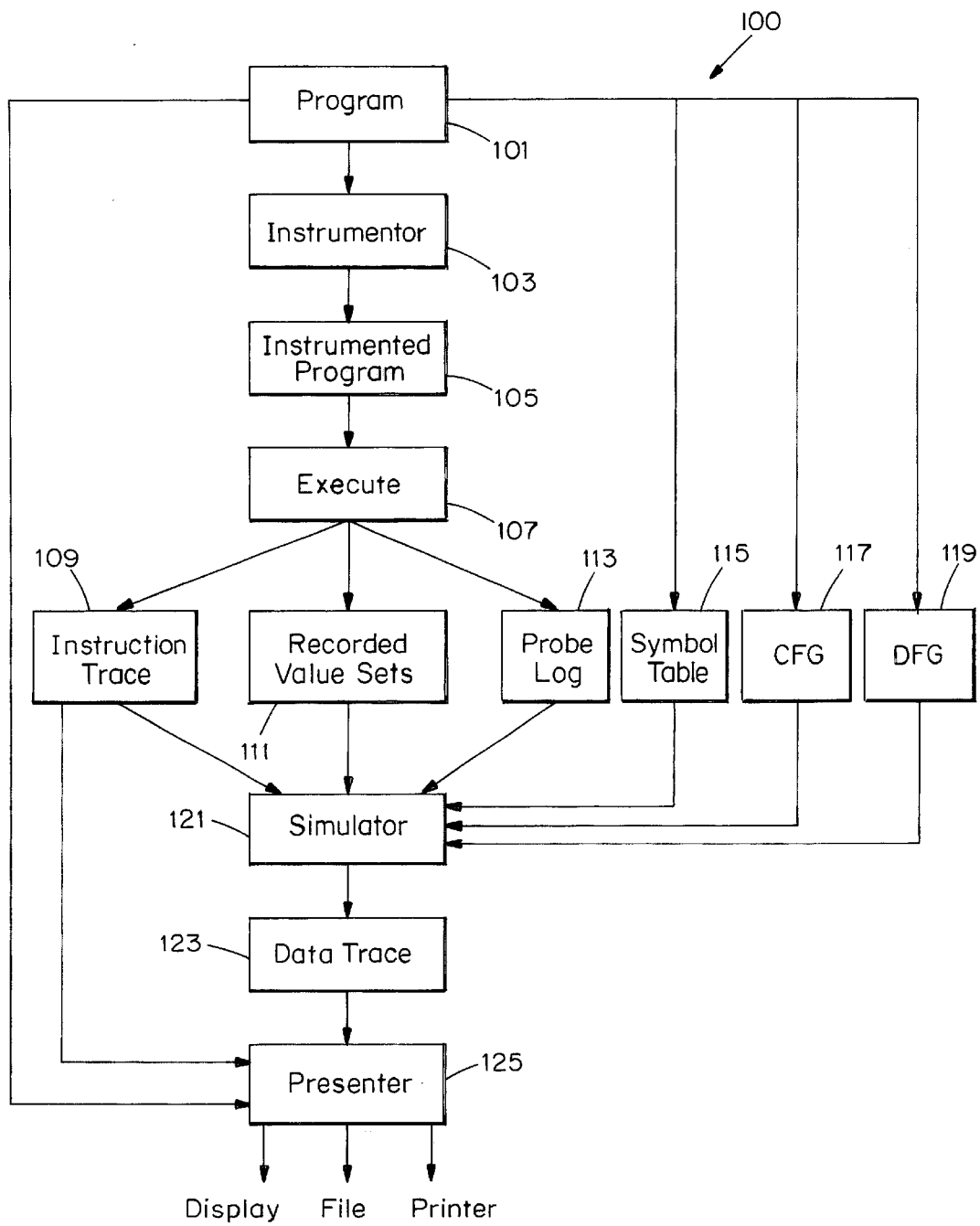
FIG. 3 is a flowchart of the entire process which encompasses a preferred embodiment of the present invention.

FIG. 3 is a flowchart 100 of the entire process which encompasses a preferred embodiment of the present invention. An instrumentor 103 takes a program 101, which may be source code or binary code, and adds instrumentation to it to produce a instrumented program 105. Of course, if the source code is instrumented, the program will have to be compiled before execution. A symbol table 115 may be available from the compiler (not shown). Similarly, an extended range table may also be available (not shown). The extended range table identifies a source variable name with a register or a memory location within a given range of instructions in the binary executable file. Such a table allows a variable's value to be shown next to the variable name in a user-display. Similarly, a control flow graph 117 and/or data flow graph 119 may be available from prior analysis of the program.

The instrumented program 105 is then executed at step 107. The instrumentation code added by the instrumentor 103 creates an instruction trace 109 of the execution, recorded value sets 111, and a probe log 113 containing any information recorded by instrumented probes.

The simulator 115, of which the flowchart 10 of FIG. 1 is a particular embodiment, builds or reconstructs a data trace 117 from the instruction trace 109, recorded value sets 111 and the probe log 113. The simulator can use as additional input, if available, the symbol table 115, the control flow graph 117 and the data flow graph 117.

Finally, a presenter 125 presents the data trace to a user via, for example a Web page, a display, a file or a printer, where a user can be a human, or another software application. Note that the instruction trace 109 and the program itself 101 may be available to the presenter 125, so that, for example, instructions may be displayed alongside the corresponding data trace values. If source code is available, then source look can be shown next to instructions. The relationship between trace instructions and source line can be obtained, for example, from the source line table.

Figure 4:
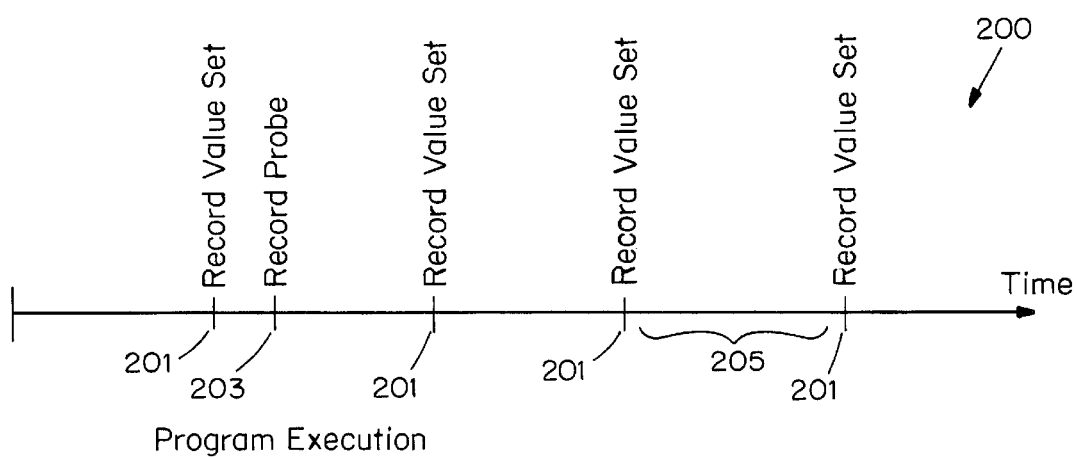
FIG. 4 is a timeline illustrating the general operation of an embodiment of the present invention.

FIG. 4 is a timeline 200 showing the general operation of an embodiment of the present invention. As the program executes, value sets are recorded at certain points 201 during the execution. The intervals 205 may be regular as shown, or they may be more sporadic, depending on the actual implementation. In addition, at time 203, a probe is activated to record its data.

An embodiment of the present invention can allow a user to adjust the amount of data to be recorded, or the frequency with which it is recorded, by providing an on-screen dial or some other on-screen control.

The variable values displayed in the data log can also be placed next to their user visible name from the program to aid in understandability. A symbol table is required for this matching of machine name or address to program name.

As an added convenience step, the backwards trace recorded during an execution, or created through backwards simulation from the final-value-set can focus on just the values or variables that a user is interested in. For example, a user is often only interested in program variables. A user might not be interested in temporary variables created by the compiler.

In producing the data trace in at least one embodiment, all answers produced by the instructions are recorded. For example, if an instruction adds registers A and B, then the value resulting from the add is recorded.

The program or library name is shown next to data values to distinguish between values from multiple programs, or from a multi-threaded program.

In at least one embodiment of the present invention, the user is provided a dial to control, i.e., increase or decrease, the amount of recording. Preferably, this is a virtual control whose image appears on a computer display.

Additional information can be recorded, particularly at the point of a crash. Many operating systems (OSs) allow a program to register a user exception handler, which is called by the OS when the program crashes. An example is the structured exception handler of Windows NT. The handler can do the recording of the information, which can include, but is not limited to, the names and identifiers of other processes running on the same machine at the time of the recording, the names and identifiers of other processes running on other machines in distributed networked environment at the time of the recording, the set of files in use at the time of the recording, and system level parameters at the time of the recording. System level parameters include, but are not limited to, CPU utilization, active pages, the size of swapped data, and so on.

It will be apparent to those of ordinary skill in the art that methods involved in the present system for determining the degree to which changed code has been exercised may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for creating a program execution data trace, comprising:
    recording a first value set associated with execution of a first instruction referenced in an instruction trace; and
    for a second instruction referenced in the instruction trace, and responsive to the first value set, determining a second value set by simulating instructions from the first instruction to the second instruction according to the instruction trace, the second instruction executing before the first instruction such that instructions are stimulated backward from the first instruction to the second instruction.

2. The method of claim 1, further comprising:
    instrumenting the program to record the value sets.

3. The method of claim 1, further comprising:
    determining a control flow representation of the program, wherein determining a second value set is further responsive to the control flow, representation.

4. The method of claim 1, wherein the second instruction executes immediately prior to the first instruction.

5. The method of claim 1, further comprising maintaining a table which associates program instructions encountered in the instruction trace with simulation instructions which reverse the operation of the of the associated program instructions.

6. The method of claim 1, further comprising examining the instruction trace for a previous computation of an unknown value.

7. The method of claim 6, wherein the previous computation is an immediate previous dominator of the "current" instruction found by searching backwards through the instruction trace.

8. The method of claim 6, wherein the previous computation is found by using a static analysis of the program to find the immediate dominator of an instruction, where there are no intervening instructions impacting the value of the variable.

9. The method of claim 4, wherein the first value set is a final value set.

10. The method of claim 9, wherein the final-value-set is recorded responsive to a program crash.

11. The method of claim 9, wherein the final value set is recorded by a user-provided exception handler, the exception handler being registered with an operating system.

12. The method of claim 9, wherein recording the final-value-set further comprises recording system level parameters and values.

13. The method of claim 12 wherein system level parameters and values include the names and identifiers of other processes running on the same machine at the time of recording.

14. The method of claim 12 wherein system level parameters and values include the names and identifiers of other processes naming on other machines in a distributed networked environment at the time of recording.

15. The method of claim 12 wherein system level parameters and values include the set of files in use by the program at the time of recording.

16. The method of claim 12 wherein system level parameters and values include CPU utilization information at the time of recording.

17. The method of claim 12 wherein system level parameters and values include active pages at the time of recording.

18. The method of claim 12 wherein system level parameters and values include a size of swapped data at the time of recording.

19. The method of claim 1, wherein the first value set is an intermediate-value-set.

20. The method of claim 19, wherein the intermediate-value-set is recorded during execution of the program.

21. The method of claim 20, wherein the intermediate-value-set is recorded responsive to a predetermined event.

22. The method of claim 21, wherein the predetermined event is a user-specified event.

23. The method of claim 21, wherein the predetermined event is a loading of a value.

24. The method of claim 21, wherein the predetermined event is a storing of a value.

25. The method of claim 20, wherein a plurality of intermediate-value-sets are recorded at intermittent intervals of time.

26. The method of claim 1, wherein the second instruction executes after the first instruction such that instructions are simulated forward from the first instruction to the second instruction.

27. The method of claim 26, wherein the second instruction executes immediately after the first instruction.

28. The method of claim 26, wherein the first value set is an intermediate-value-set.

29. The method of claim 28, wherein the intermediate-value-set is recorded during execution of the program.

30. The method of claim 29, wherein a plurality of intermediate-value-sets are recorded at intermittent intervals of time.

31. The method of claim 1, further comprising:
inserting a probe instruction into the program to save a value of a particular variable at a particular instruction in the program.

32. The method of claim 31, wherein the probe instruction is inserted to record a value returned from a call.

33. The method of claim 32, wherein the call is a system call.

34. The method of claim 31, wherein the probe instruction is inserted to record a value returned from an I/O call.

35. The method of claim 31, wherein the probe instruction is inserted to record a value obtained from a database record.

36. The method of claim 31, wherein a variable to monitor by probe is determined by simulating a simulate-back process.

37. The method of claim 31, wherein a variable to monitor by probe is determined by performing a dry run of a simulation on at least one sample trace sequence.

38. The method of claim 31, wherein placement of the probe instruction and selection of the particular variable are responsive to an analysis of the program.

39. The method of claim 38, wherein the analysis comprises a control flow analysis.

40. The method of claim 38, wherein the analysis comprises a data flow analysis.

41. The method of claim 40, wherein the analysis further comprises a control flow analysis.

42. The method of claim 1, further comprising:
providing a control for adjusting a quantity of data to be recorded.

43. The method of claim 42, wherein the quantity of data to be recorded is adjusted by setting a time interval after which data is recorded.

44. The method of claim 42, wherein the quantity of data to be recorded is adjusted by setting a frequency at which to record data.

45. The method of claim 42, wherein the quantity of data to be recorded is adjusted by setting a frequency of a predetermined event at which to record data.

46. The method of claim 42, wherein the quantity of data to be recorded is adjusted by setting a type of data to be recorded.

47. The method of claim 42, wherein the quantity of data to be recorded is adjusted by setting address ranges within which to record data.

48. The method of claim 42, wherein the control is a virtual control displayed on a computer display.

49. The method of claim 48 wherein the control is a dial.

50. The method of claim 1, further comprising:
accessing a symbol table to retrieve a variable's name; and
displaying the variable's name next to the variable's value.

51. The method of claim 1, further comprising:
providing means to focus on variables of a particular interest.

52. The method of claim 51, wherein variables of interest include program variables named in source code.

53. The method of claim 51, wherein variables of interest exclude temporary variables created by a compiler.

54. The method of claim 51, wherein variables of interest include registers.

55. The method of claim 51, wherein variables of interest include variables at specified memory locations.

56. The method of claim 51, wherein variables of interest include variables within a specified memory range.

57. The method of claim 1, further comprising:
displaying the data trace to a user.

58. The method of claim 57, further comprising:
displaying the instruction trace alongside and correlated with the data trace.

59. The method of claim 1, wherein determining a second value set is performed only upon a request, the request indicating for which instruction the second value set is desired.

60. The method of claim 59, further comprising:
displaying the instruction trace;
only upon a request for a value of a data variable corresponding to a particular instruction in the instruction trace, performing the step of determining the second value set by simulating instructions to the particular instruction; and
displaying the second value set.

61. The method of claim 60, wherein the second value set comprises variables whose values are set in the particular instruction.

62. The method of claim 1, further comprising:
recording at least one answer produced by at least one instruction.

63. The method of claim 62, wherein at least one instruction is an add instruction, and the answer produced by the instruction is a sum.

64. A system for creating a program execution data trace using an instruction trace, comprising:
an instrumentor which instruments the program to record value sets, such that upon execution of an instrumented instruction, a value set is recorded; and
a simulator for determining, responsive to the instruction trace and a recorded value set, a new value set by simulating backward instructions from an instrumented instruction associated with the recorded value set to a second instruction according to the instruction trace.

65. The system of claim 64, wherein the instrumentor is part of a compiler.

66. The system of claim 64, wherein the program source code is instrumented.

67. The system of claim 64, wherein the program binary code is instrumented.

68. The system of claim 64, wherein the simulator examines the instruction trace for a previous computation of an unknown value, and upon finding such a computation, uses the computation to fill in the unknown value.

69. The system of claim 68, wherein the previous computation is an immediate previous dominator of the "current" instruction found by searching backwards through the instruction trace.

70. The system of claim 68, wherein the previous computation is found by using a static analysis of the program to find the immediate dominator of an instruction, where there are no intervening instructions impacting the value of the variable.

71. The system of claim 64, wherein the instrumentor instruments the program to record a plurality of intermediate-value-sets at intermittent intervals of time.

72. The system of claim 64, wherein the instrumentor further inserts a probe instruction into the program to save a value of a particular variable at a particular instruction in the program.

73. The system of claim 72, wherein the instrumentor determines a variable to monitor by probe by simulating a simulate-back process.

74. The system of claim 72, wherein the instrumentor determines a variable to monitor by probe by performing a dry run of a simulation on at least one sample trace sequence.

75. The system of claim 72, wherein the instrumentor determines placement of the probe instruction and selection of the particular variable responsive to an analysis of the program.

76. The system of claim 75, wherein the analysis comprises a control flow analysis.

77. The system of claim 76, wherein the analysis comprises a data flow analysis.

78. The system of claim 64, further comprising:
a control for adjusting a quantity of data to be recorded.

79. The system of claim 64, further comprising:
a display for displaying the data trace.

80. The system of claim 64, further comprising:
a display for displaying the instruction trace; and
an input device for requesting for a value of a data variable corresponding to a particular instruction in the instruction trace, such that upon such a request, the simulator performs the step of determining the second value set by simulating instructions to the particular instruction and displays the second value set on the display.

81. The system of claim 64 wherein the instrumented instruction and the second instruction are different execution instances of the same statement.

82. A computer system for creating a program execution data trace using an instruction trace, comprising:
means for instrumenting the program to record value sets; and
means for determining a new value set, responsive to the instruction trace and a recorded value set by simulating backward instructions from an instrumented instruction associated with the recorded value set to a second instruction according to the instruction trace.

83. The computer system of claim 82, further comprising:
means for inserting a probe instruction into the program to save a value of a particular variable upon the execution of a particular statement in the program.

84. A computer program product for creating a program execution data trace, the computer program product comprising a computer usable medium having computer readable code thereon, including program code which:
instruments the program to record value sets; and
determines a new value set, responsive to an instruction trace and a recorded value set by simulating instructions backward from an instrumented instruction associated with the recorded value set to a second instruction according to the instruction trace.

85. A computer memory configured for creating a program execution data trace, comprising:
an instrumentor which instruments the program to record value sets, such that upon execution of an instrumented instruction, a value set is recorded;
a simulator for determining, responsive to an instruction trace and a recorded value set, a new value set by simulating instructions backward from an instrumented instruction associated with the recorded value set to a second instruction according to the instruction trace; and
a presenter for presenting the new value set to a user.

86. A method for displaying data from an execution run of a program instrumented to record value sets, comprising:
displaying instructions from the execution run in an order in which the instructions executed;
for at least one displayed instruction, determining answers produced by the instruction, by simulating instructions backward from a value set recording to the at least one displayed instruction; and
displaying the answers with the instruction which produced the answers.

87. The method of claim 86, wherein the at least one displayed instruction is selected by a user.

88. The method of claim 86, further comprising:
displaying a source variable name next to its value.

89. The method of claim 86, further comprising:
displaying a source instruction, a source variable name referenced in the instruction, and the source variable's value.

90. The method of claim 89, further comprising:
displaying a program name next to the source instruction, the program containing the source instruction.

91. The method of claim 89, further comprising:
displaying a thread name next to the source instruction, the thread containing the source instruction.

* * * * *

UNITED STATES PATENT AND TRADEMARK OFFICE
CERTIFICATE OF CORRECTION

PATENT NO. : 6,804,814 B1
DATED : October 12, 2004
INVENTOR(S) : Andrew E. Ayers, Richard Schooler and Anant Agarwal It is certified that error appears in the above-identified patent and that said Letters Patent is hereby corrected as shown below:

Column 11,
Line 66, please change "stimulated" to -- simulated --.

Signed and Sealed this

Eighteenth Day of January, 2005

JON W. DUDAS
*Director of the United States Patent and Trademark Office*